B. HILLER.
MEAT CURING DEVICE.
APPLICATION FILED SEPT. 29, 1913.

1,108,755.

Patented Aug. 25, 1914.
2 SHEETS—SHEET 1.

Witnesses:
Ruth B. King
Lloyd W. Patch

Inventor:
Balthaser Hiller
By Lewis Baggett & Co.
His Attys.

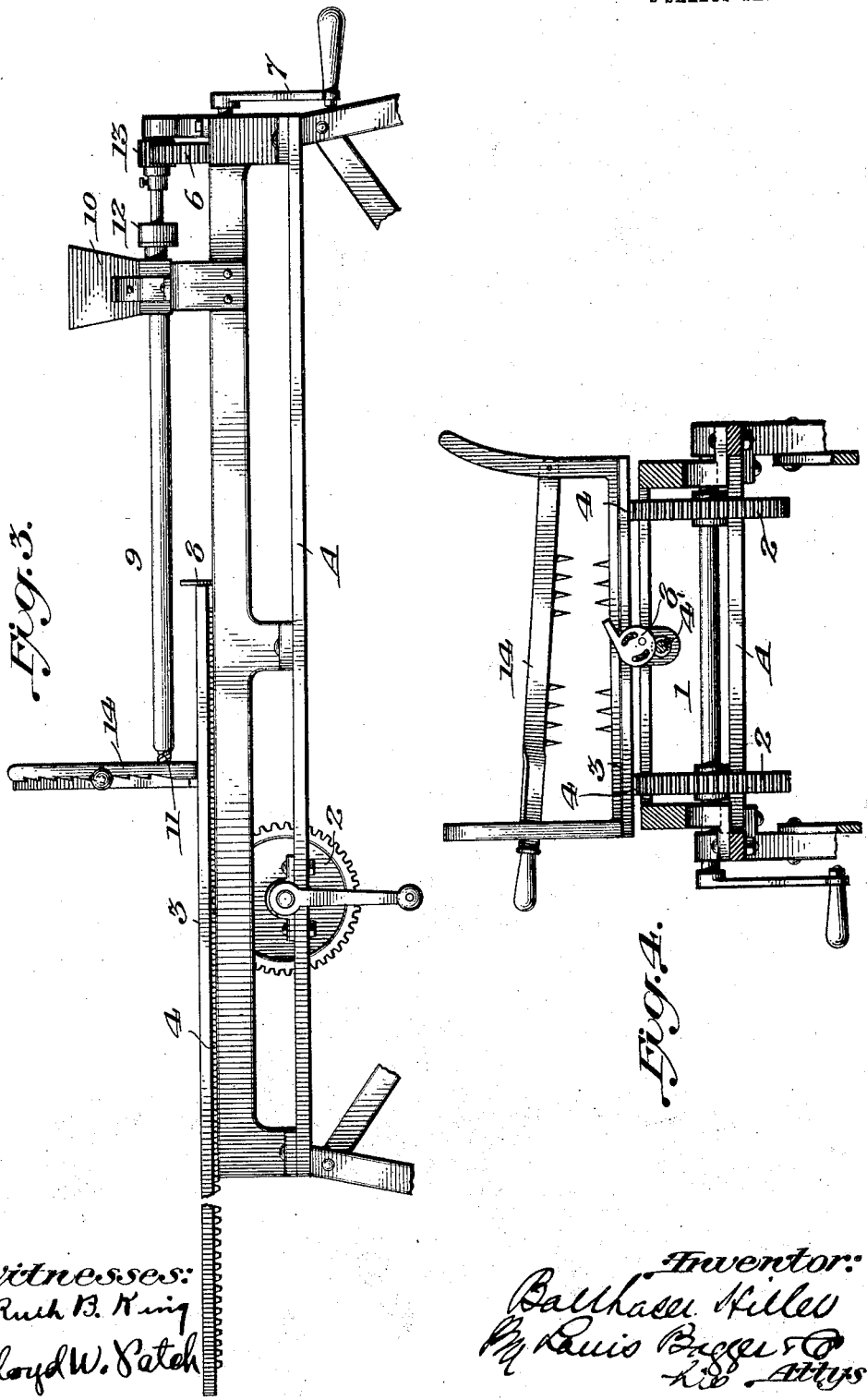

UNITED STATES PATENT OFFICE.

BALTHASER HILLER, OF HUDSON, WISCONSIN.

MEAT-CURING DEVICE.

1,108,755.   Specification of Letters Patent.   Patented Aug. 25, 1914.

Application filed September 29, 1913. Serial No. 792,376.

*To all whom it may concern:*

Be it known that I, BALTHASER HILLER, citizen of the United States, residing at Hudson, in the county of St. Croix and State of Wisconsin, have invented certain new and useful Improvements in Meat-Curing Devices, of which the following is a specification.

My invention relates to an improvement in meat-curing devices, and the object is to provide a machine for introducing the salt into the meat.

The invention consists of certain novel features of construction and combinations of parts which will be hereinafter more fully described and pointed out in the claims.

Figure 1:
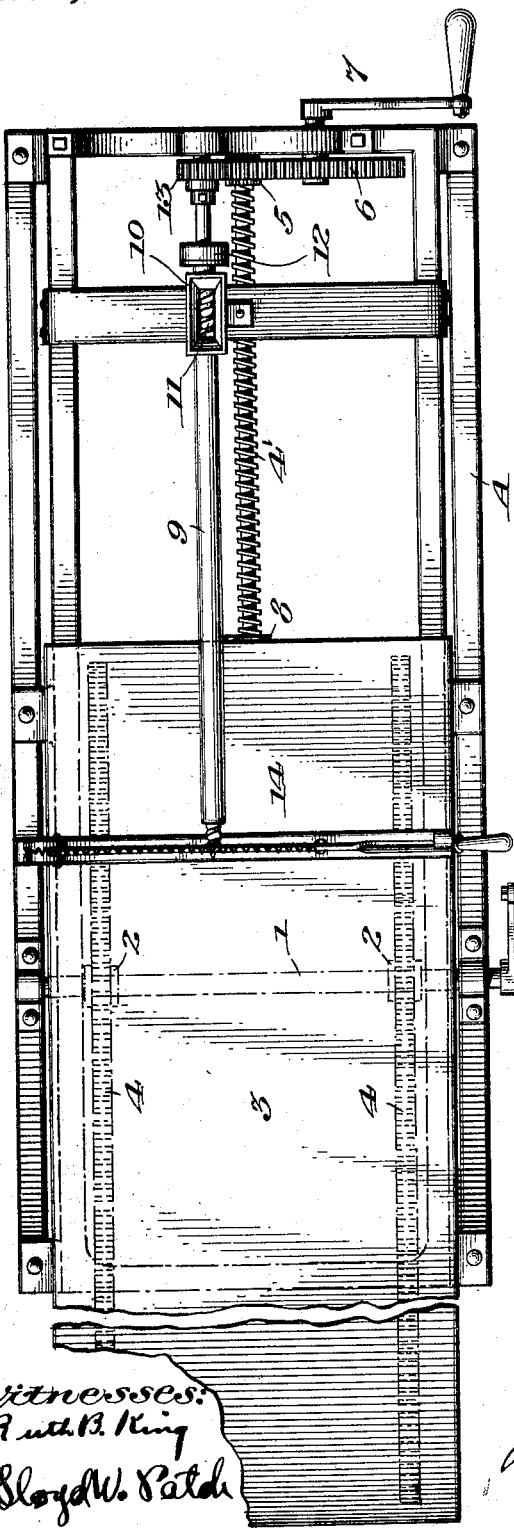
Figure 2:
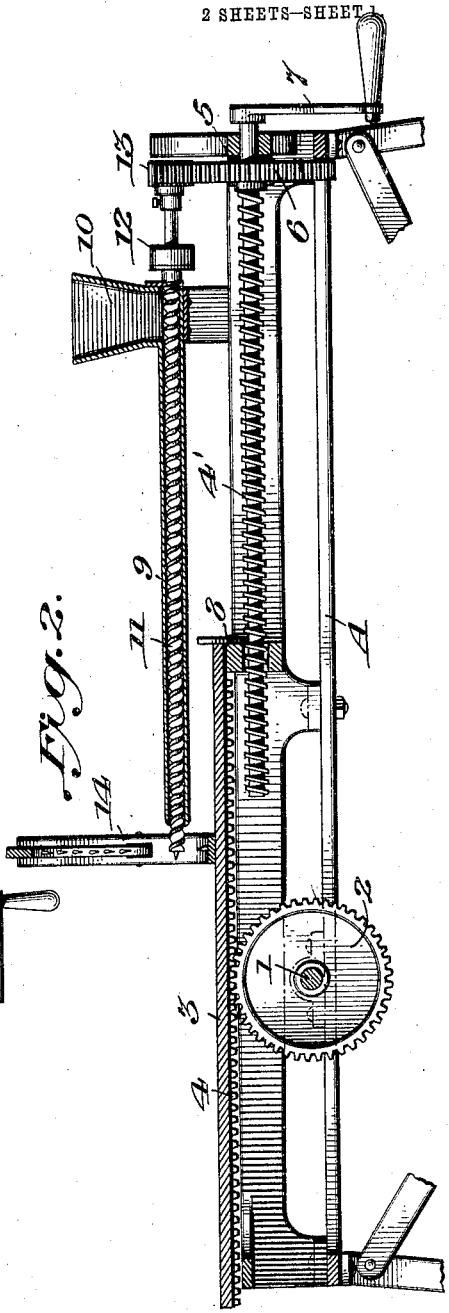

In the accompanying drawings: Figure 1 is a top plan view; Fig. 2 is a longitudinal vertical sectional view; Fig. 3 is a view in side elevation; and Fig. 4 is a cross sectional view.

A represents the frame of the machine, which is provided with a shaft 1 carrying gear wheels or pinions 2, 2. The sliding table 3 is mounted upon the frame, and is provided with two rack bars 4, 4, adapted to mesh with the teeth of the pinions 2, 2. A screw threaded shaft 4' is mounted upon the frame A, and has a pinion 5 connected thereto, which meshes with the gear wheel 6 mounted on the frame A. A crank handle 7 is connected to the gear wheel for rotating the same for causing the shaft 4' to be rotated. A clutch 8 is connected to the table A, and engages the screw threads of the shaft 4, whereby the table is caused to move lengthwise of the frame upon the rotation of the gear wheel 6. A tube 9 is mounted upon the frame, and extends above the table 3. This tube is provided with a hopper 10, in which salt or other curing medium is introduced to be forced through the tube or casing 9. Journaled in the tube is a screw conveyer shaft 11. The shaft 11 extends beyond both ends of the tube, and is journaled therein in a ball bearing 12 connected to the tube at its forward end. A pinion 13 is mounted upon the shaft 11 and meshes with the gear wheel 6, whereby the shaft 11 receives a rotary movement. A meat holder 14 is connected to the table, whereby meat such as ham or the like can be fastened rigidly to the movable table.

When the meat is to be treated, crank 7 is turned, causing the table 3 to be moved toward the hopper 10 or toward the forward end of the machine. This causes the tube to be forced into the meat, and after the tube has been forced into the meat a sufficient distance, the crank is turned in the opposite direction, causing the salt or curing medium to be conveyed from the hopper through the tube, and into the meat by the screw shaft 11. The table 3 is moving rearwardly, carrying the meat vertically, and drawing it off from the tube 9, so that as the meat moves away from the tube, a supply of salt is left within the meat.

Having fully described my invention, what I claim as new and desire to secure by Letters Patent is:

1. The combination with a frame having a movable table, of a stationary tube, means for moving the table for causing the meat to be penetrated by the tube, means for holding the meat on the table so that it can be penetrated and means for introducing a curing substance into the meat through the tube.

2. The combination with a frame having a movable table, of a stationary tube, means for moving the table for causing the meat to be penetrated by the tube, means for holding the meat on the table so that it can be penetrated and means actuated by said first-named means for introducing a curing substance into the meat as said first-named means is actuated for moving the table in another direction to remove the meat from the tube.

3. The combination with a frame having pinions mounted thereon, of a movable table provided with rack bars adapted to engage the pinions for supporting the table, means on the table for holding the meat so that it may be penetrated, a stationary tube through which the curing substance is introduced into the meat, means engaging an end of the table for causing the table to be moved for forcing the tube into the meat, and means actuated by said last-mentioned means for introducing the curing substance into the meat as the table is moved in another direction for removing the meat from the tube.

In testimony whereof I affix my signature, in the presence of two witnesses.

BALTHASER HILLER.

Witnesses:
 JOHN DORWIN,
 LYNN H. ASHLEY.

Copies of this patent may be obtained for five cents each, by addressing the "Commissioner of Patents, Washington, D. C."